United States Patent [19]

Ellis

[11] 4,264,134

[45] * Apr. 28, 1981

[54] DISPLAY ARRANGEMENTS

[75] Inventor: Stafford M. Ellis, East Preston, England

[73] Assignee: Elliott Brothers (London) Limited, Chelmsford, England

[*] Notice: The portion of the term of this patent subsequent to Jul. 11, 1995, has been disclaimed.

[21] Appl. No.: 40,927

[22] Filed: May 21, 1979

[30] Foreign Application Priority Data

May 26, 1978 [GB] United Kingdom ............... 23126/78

[51] Int. Cl.³ .............................................. G02B 27/12
[52] U.S. Cl. ................................................... 350/174
[58] Field of Search ............................. 350/173, 174; 358/109 C; 250/238 C; 178/4.1 C

[56] References Cited

U.S. PATENT DOCUMENTS

| 3,297,822 | 1/1967 | Braid | 350/174 |
| 3,666,887 | 5/1972 | Freeman | 350/174 |
| 3,778,548 | 12/1973 | Nistri | 350/174 |
| 3,802,764 | 4/1974 | Ellis | 350/174 |
| 3,936,148 | 2/1976 | Ellis | 350/173 |
| 4,042,957 | 8/1977 | Ellis | 350/173 |
| 4,099,841 | 7/1978 | Ellis | 350/173 |

*Primary Examiner*—John K. Corbin
*Assistant Examiner*—B. W. de los Reyes
*Attorney, Agent, or Firm*—Kirschstein, Kirschstein, Ottinger & Cobrin

[57] ABSTRACT

A vehicle display arrangement comprising a head-up display unit (11) and a head-down display unit (13) providing a collimated display which appears to an observer to be a continuation of the head-up unit display. A fully reflective element (29) between the units cooperates with a parallel semi-reflective element (23) in front of the head-down display to shift head-down display information so that there is no gap in the display corresponding to the space (38) between the units.

6 Claims, 3 Drawing Figures

DISPLAY ARRANGEMENTS

This invention relates to display arrangements for vehicles, especially aircraft.

The invention relates particularly to vehicle display arrangements of the kind incorporating a head-up display unit. The head-up display unit provides an observer using the arrangement with a view of a distant scene outside the vehicle on which is superposed a collimated display produced by the unit, thus allowing the observer to view the distant scene and display simultaneously.

In such arrangements the field of view presented to the observer by the head-up display unit is fairly limited. A particular aspect of this problem arises where the display presents dynamic symbols e.g. indicating vehicle attitude developed from signals generated by sensors such as gyros. As the vehicle manoeuvres the positions of these dynamic symbols are controlled so as to appear to the observer to remain superposed on the appropriate point on the distant scene.

Such a dynamic symbol will therefore disappear when the vehicle manoeuvres so that the point on the distant scene on which it should be superposed moves outside the observer's field of view of the distant scene provided by the head-up display unit, thus causing the observer to lose track of the symbol.

It is an object of the present invention to provide a vehicle display arrangement incorporating a head-up display unit wherein this problem may be alleviated.

According to the present invention there is provided a vehicle display arrangement comprising a head-up display unit; a head-down display unit which presents a collimated head-down display and is located alongside the head-up display unit; an optically flat, fully light reflective first element extending between the adjacent edges of the displays presented by the head-up display unit and the head-down display unit; and an optically flat, partially light transmissive, partially light reflective, second element disposed between the viewing position of an observer using the arrangement and the head-down display unit and parallel to the first element so that the observer is provided with a continuous uninterrupted field of view of the displays presented by said units, the portion of said field of view corresponding to the space between said units being provided by light reaching the observer from the head-down display unit after successive reflection at the second and first elements.

Preferably said second element extends from the edge of the display presented by the head-down display unit remote from the head-up display unit so that the observer's view of the head-down display other than by way of successive reflection at the first and second elements is through the second element.

The head-up display head unit is suitably of the kind employing a multi-film combiner as described and claimed in the applicants U.S. Pat. No. 4,099,841 which issued on July 11 1978, and is assigned to Elliott Brothers (London) Limited.

In use of the arrangement the head-down display unit may be arranged to present a distant scene representation which constitutes a continuation of the part of the distant scene visible to the observer using the head-up display unit. Symbols representing dynamic display data can then be superposed at appropriate positions anywhere in the field of view of the distant scene presented to the observer by the display arrangement by the supply of appropriate activating signals to the head-up and/or head-down display unit.

One display arrangement in accordance with the invention will now be described by way of example with reference to the accompanying drawings in which.

Figure 1:
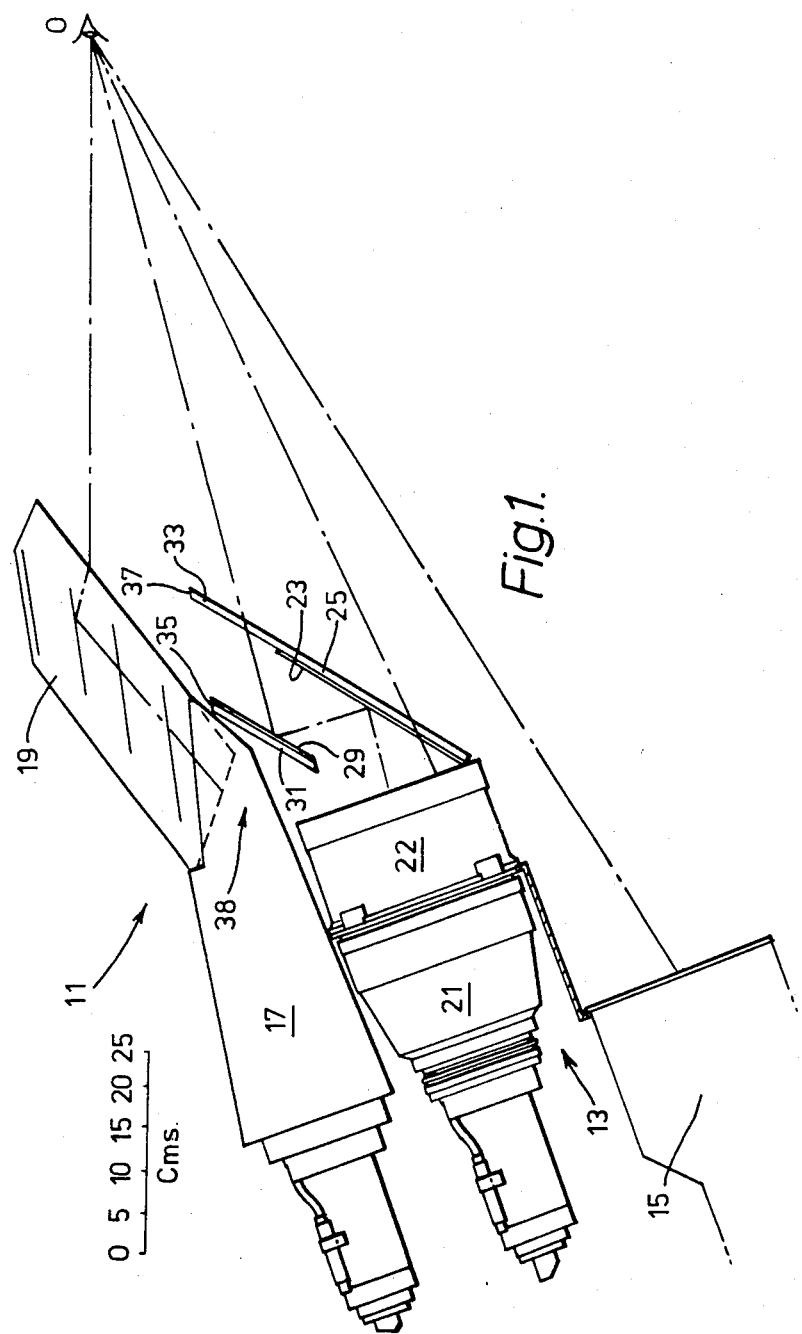
FIG. 1 depicts, to the scale shown, a side elevational view of the arrangement.
Figure 2:
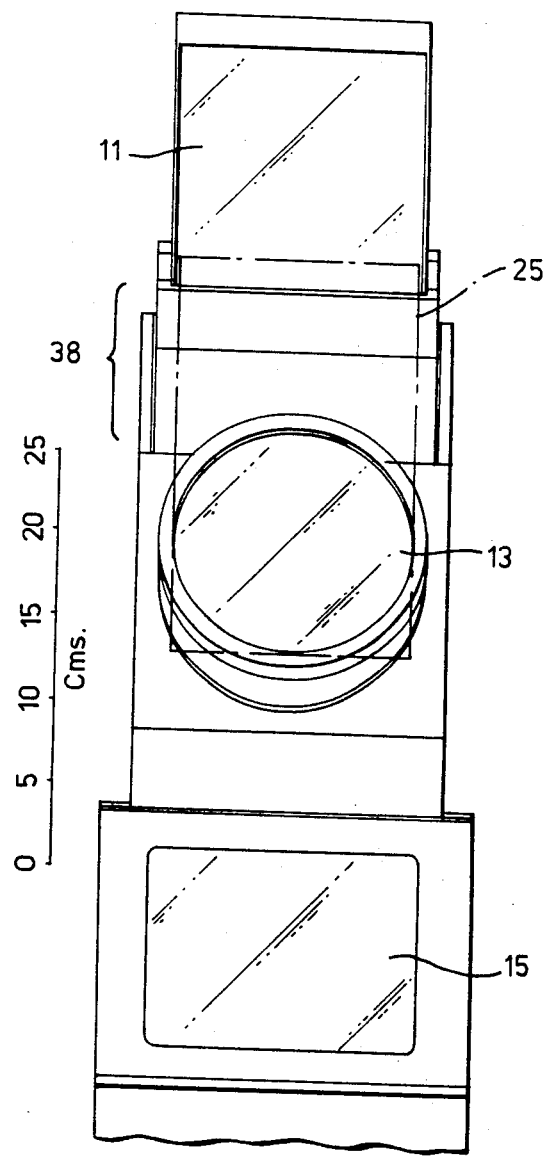
FIG. 2 depicts, to the scale shown, an elevational view of the arrangement from the direction of an observer using the arrangement.

Referring to FIGS. 1 and 2, the arrangement is intended for use in an aircraft cockpit and comprises a head-up display unit 11, beneath the head-up display unit 11 a head-down display unit 13, and beneath the head-down display unit 13, a further head-down display unit 15.

The lower head-down display unit 15 presents an uncollimated display. It may, for example, be a T.V. raster type display unit presenting information as to the operational status of various aircraft systems or it may be a moving map display.

The head-up display unit 11 comprises an optical projector 17 and a combiner 19. The combiner 19 is disposed in the observer's line-of-sight to the distant scene outside the aircraft and the projector 17 is arranged to project collimated light representing a display upwardly onto the combiner 19 for reflection to the observer so that the observer sees an image of the display superposed on his view of the distant scene through the combiner 19. The combiner member is, as shown, of the multi-film type as described and claimed in the above-mentioned U.S. Pat. No. 4,099,841.

The head-down display unit 13 comprises a cathode ray tube 21 and associated optical system 22 including optical means for collimating the image produced on the screen of the cathode ray tube 21.

Between the display unit 13 and the observer's viewing position there is a partially light-transmissive, partially light-reflective optically flat coating 23 carried on a lower part of the surface of a glass sheet 25. The sheet 25 and coating 23 extend upwardly and rearwardly towards the observer's viewing position from the lower edge of the display produced by the head-down display unit 13. There is, further, a fully light reflective coating 29 carried on a glass plate 31. The coating 29 and the glass plate 31 extend upwardly and rearwardly towards the observer's viewing position from the upper edge of the display produced by the head-down display unit 13 to the lower edge of display produced by the head-up display unit 11. The two glass plates 25, 31 lie in parallel planes. The upper edge of the coating 23 is in register with the lower edge of the glass plate 31 viewed from the observer's viewing position 0. The upper part 33 of the glass plate 25 is thus substantially fully light transmissive. The upper edges 35 and 37 of the two plates 31 and 25 respectively are bevelled and lie in the same plane from the observer's viewing position 0.

The chain dotted lines in FIG. 1 indicate the paths of light rays from the display to the observer.

The entire arrangement, the dimensions and relative disposition of the two plates 25 and 31 and the display heads 11 and 13 are such that the observer is provided with a continuous uninterrupted vertical field of view of the displays presented by the units 11 and 13.

The upper part of this field of view is provided by light from the unit 11 reaching the observer by reflection at the combiner 19, and the lower part is provided by light from the unit 13 reaching the observer by transmission through the coating 23 and the associated glass plate 25. The intermediate part of the field of view, corresponding to the space 38 between the units 11 and 13, is provided by light from the unit 13 reaching the observer by reflection first at the coating 23, then by reflection at the coating 25, and finally by transmission through the uncoated upper part 33 of plate 25.

Figure 3:
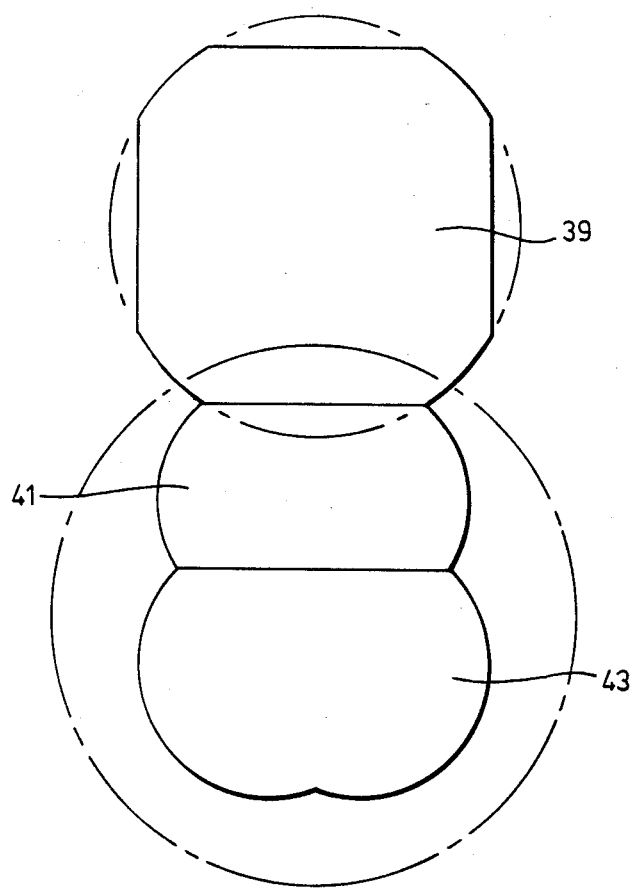
FIG. 3 illustrates the field of view obtained by the observer of a collimated display provided by the arrangement.

The field of view obtained is shown in FIG. 3, the solid lines representing the instantaneous field of view available to the observer with his eyes at the viewing position 0 and the chain dotted lines representing the total field of view available to the observer using a certain limited amount of head movement at the viewing position 0. The upper, intermediate and lower parts of the instantaneous field of view are referenced 39, 41 and 43 respectively.

In a typical application of the arrangement the head-down display unit produces in response to information signals generated by a television camera, infra-red scanner or the like, a real world scene representation which constitutes a continuation of the real world scene visible to the observer through the combiner 19 of the head-up display unit 11.

In addition, the display arrangement presents dynamic symbols to the observer in response to information signals generated by sensors such as gyros or air data systems, such symbols being presented to the observer by the display unit 11 or 13, as appropriate. In this way dynamic symbols pass from one display to the other as the aircraft manoeuvres. The fields of view of the two displays 11 and 13 thus constitute, so far as the observer is concerned, a single field of view anywhere within which symbols, in the form of virtual images at infinity, may be positioned.

It will be appreciated that a display arrangement in accordance with the invention may also be used in other ways. For example, the display presented to the observer by the head-down display unit may form a continuation only of the head-up unit symbol display or only of the view of real world scene presented to the observer by the head-up display.

I claim:

1. A vehicle display arrangement comprising: a head-up display unit; a head-down display unit which presents a collimated head-down display and is located alongside the head-up display unit; an optically flat, fully light reflective first element extending between the adjacent edges of the displays presented by the head-up display unit and the head-down display unit; and an optically flat, partially light transmissive, partially light reflective, second element disposed between the viewing position of an observer using the arrangement and the head-down display unit and parallel to the first element so that the observer is provided with a continuous uninterrupted field of view of the displays presented by said units, the portion of said field of view corresponding to the space between said units being provided by light reaching the observer from the head-down display unit after successive reflection at the second and first elements.

2. An arrangement according to claim 1 wherein said second element extends from the edge of the display presented by the head-down display unit remote from the head-up display unit so that the observer's view of the head-down display other than by way of successive reflection at the first and second elements is through the second element.

3. An arrangement according to claim 1 for use in an aircraft cockpit wherein the head-down display unit is located below the head-up display unit and said first and second elements extend from their lower edges upwardly and rearwardly towards the observer's viewing position.

4. An arrangement according to claim 3 wherein said first and second elements are in the form of coatings carried on first and second plates respectively, the second plate being light transmissive.

5. An arrangement according to claim 4 wherein the upper edges of the first and second plates are bevelled and lie in the same plane from the observer's viewing position.

6. An arrangement according to claim 5 wherein the upper edge of the coating on the second plate is in register with the lower edge of the first plate viewed from the observer's viewing position.

* * * * *